A. V. BROWN.
TEMPLE FOR SPECTACLES.
APPLICATION FILED SEPT. 20, 1917.
1,238,497.
Patented Dec. 24, 1918.
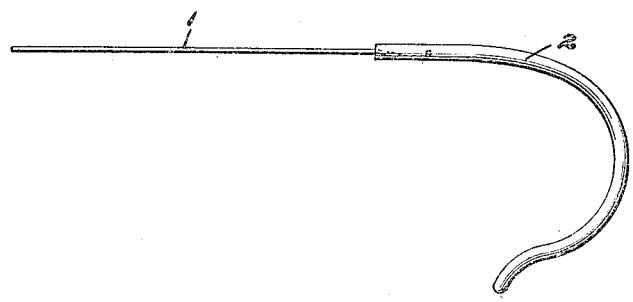
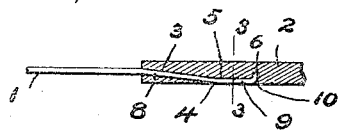
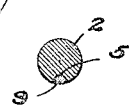
Inventor
Andrew V. Brown
By Cyrus N. Anderson
Attorney

UNITED STATES PATENT OFFICE.

ANDREW V. BROWN, OF PHILADELPHIA, PENNSYLVANIA.

TEMPLE FOR SPECTACLES.

1,288,497.  Specification of Letters Patent.  Patented Dec. 24, 1918.

Application filed September 20, 1917. Serial No. 192,322.

*To all whom it may concern:*

Be it known that I, ANDREW V. BROWN, a citizen of the United States, and a resident of the city of Philadelphia, county of Philadelphia, State of Pennsylvania, have invented certain new and useful Improvements in Temples for Spectacles, of which the following is a specification.

My invention relates to temples for spectacles of the character in which the temples' sides are composed of metallic wire parts which are connected with the lenses and non-metallic parts which constitute the rear end portions of the temples which are adapted to rest upon the ears of a person wearing spectacles. These non-metallic parts are of relatively large diameter and thereby provide or offer larger bearing surfaces for contact with the ears of a wearer. In consequence they do not cut into the ears and generally are more comfortable than the ordinary wire temples in which the rear end curved parts which engage and rest upon the ears consist of small wire portions which are apt to cause discomfort.

Heretofore the difficulty has been to find an economical satisfactory way of connecting together the metallic and non-metallic parts of the temples and it is the object of my invention to provide an improvement in the connection between the said parts of the respective temples.

A further object of my invention is to provide a construction in which the connection between the metallic and non-metallic parts of the temples is simple, neat in appearance, and which may be constructed economically; and also to provide a connection which is secure so that when temples are constructed in accordance with my invention the metallic and non-metallic parts will not become accidentally separated from or displaced relatively to each other.

In order that my invention may be clearly and readily understood and its practical advantages fully appreciated reference may be had to the accompanying drawing in which I have illustrated one embodiment thereof. It will be understood that modifications of the construction may be made within the scope of the claims without departing from my invention.

In the drawing,—

Figure 1 is a view in side elevation of a temple for spectacles embodying my invention;

Fig. 2 is a view showing the front portion of a non-metallic part in central longitudinal section and the rear portion of a metallic part in side elevation, the said view showing in detail the way in which the two parts are connected; and Fig. 3 is a transverse sectional view taken on the line 3—3 of Fig. 2.

Referring to the drawing, 1 designates the metallic part of a temple for spectacles, the front end of which is adapted to be pivotally connected with the lenses in the usual known manner, and 2 designates the non-metallic part of said temple. The said last mentioned part may consist of any suitable non-metallic material, such as xylonite. The said non-metallic part is curved in the usual way to extend over and around the rear part of the ears of a wearer.

The non-metallic part 2 is provided at its forward end portion with an opening 3, the forward end of which is situated at or near the center of the front end of said part. The said opening extends rearwardly from the front end of said part and is inclined at on angle to the length of the same so that its rear end opens upon the side of said part, as shown at 4, a relatively short distance from the front end thereof. In the construction shown the said part 2 is provided with a groove 5 in line with said opening 3 which terminates in a depression or blind hole 6.

The part 1 is provided near its rear end with a portion 8 which is inclined as shown and which fits in the inclined opening 3. The rear portion 9 of the said part 1 fits in the groove 5 and said portion terminates in a laterally bent or projecting portion 10 which fits into the depression or hole 6. The portion 9 is out of alinement with, but is substantially parallel with the front body portion of the part 1.

It will be understood that after the connected ends of the parts 1 and 2 are placed in the position with respect to each other shown in the drawing the said ends are compressed so as to press the forward end portions of the part 2 firmly about and against the rear end portions of the part 1 and thereby firmly and securely fasten them together.

It is apparent that when the parts are thus fastened and secured together it is practically impossible to separate them by opposing pulling forces; also, that they cannot be turned or twisted relatively to each other at their point of connection.

Although I have illustrated and described my invention in connection with a temple for eyeglasses and as being embodied in the connection between a wire part of relatively small diameter and a non-metallic part of relatively large diameter, it will be understood that the same form of connection may be employed in connecting other similar parts.

I claim:—

1. A temple for spectacles comprising a front metallic part and a non-metallic rear part, the latter having an opening extending longitudinally of its front end portion, the rear end of said opening terminating upon the side of said part a distance from the front end thereof, the rear end of the metallic part extending through said opening, and means for preventing separation of said parts.

2. A temple for spectacles comprising a front metallic part and a non-metallic rear part, the latter having an opening extending longitudinally of its front end portion, the rear end of said opening terminating upon the side of said part a distance from the front end thereof, the rear end of the metallic part extending through said opening, and means for preventing separation of said parts and also for preventing the said parts from turning relatively to each other.

3. A temple for spectacles comprising a front part of relatively small diameter and a rear part of relatively large diameter, the front end portion of the latter being provided with an opening which extends from its front toward its rear end, said opening being inclined so that its rear end terminates upon the side of said rear part a relatively short distance from the front end thereof and the said metallic part having a rear end portion inclined with respect to the remaining portion of said part and which fits the said inclined opening.

4. A temple for spectacles comprising a front metallic wire part and a rear non-metallic part, the latter being of greater diameter than the former, said non-metallic part having a hole or opening extending from its front toward its rear end at an angle with respect to the length of said part so that its rear end terminates on the side thereof a distance from its front end and the said metallic part having a rear end portion extending at an angle to the other portion thereof which angularly extended portion fits the said opening, and means for preventing the said parts from separating from or turning relatively to each other.

5. A temple for spectacles comprising a front metallic wire part and a rear non-metallic part, the latter being of greater diameter than the former, said non-metallic part having a hole or opening extending from its front toward its rear end at an angle with respect to the length of said part and terminating in a groove in the side of said non-metallic part, said groove terminating at its rear end in a depression or hole, and the rear end portions of said metallic part being formed to fit the said opening, groove and depression or hole, substantially as described.

6. A temple for spectacles comprising a front metallic wire and a non-metallic rear ear portion, the latter having a hole extending longitudinally of its front end portion, the rear end of said hole terminating upon the side of the said non-metallic part a short distance from the front end thereof, the rear end of the said metallic wire extending through the said hole and the said wire terminating in a laterally extending projection which extends transversely of the said temple into the said non-metallic part.

7. In combination, a metallic wire or pin-like part and a non-metallic part, the diameter of the latter being substantially greater than that of the former, one end portion of the said non-metallic part having an opening extending longitudinally thereof and terminating upon the side of said part a distance from the said end, and an end of the metallic part extending through said opening, and means for preventing separation of the said parts.

In testimony that I claim the foregoing as my invention, I have hereunto signed my name this 18th day of September, A. D. 1917.

ANDREW V. BROWN.

Copies of this patent may be obtained for five cents each, by addressing the "Commissioner of Patents, Washington, D. C."